F. EMENEGGER & J. H. WESTFALL.
CEREAL GRAIN HULLING SYSTEM.
APPLICATION FILED NOV. 8, 1917.

1,279,308.

Patented Sept. 17, 1918.
3 SHEETS—SHEET 1.

Inventors
J. H. Westfall
F. Emenegger

By T. K. Bryant
Attorney

F. EMENEGGER & J. H. WESTFALL.
CEREAL GRAIN HULLING SYSTEM.
APPLICATION FILED NOV. 8, 1917.

1,279,308.

Patented Sept. 17, 1918.
3 SHEETS—SHEET 3.

Inventors
J. H. Westfall
F. Emenegger

By T. A. Bryant
Attorney

UNITED STATES PATENT OFFICE.

FRANK EMENEGGER AND JOEL H. WESTFALL, OF PETALUMA, CALIFORNIA.

CEREAL-GRAIN-HULLING SYSTEM.

1,279,308.　　　　　　Specification of Letters Patent.　　Patented Sept. 17, 1918.

Application filed November 8, 1917. Serial No. 200,934.

*To all whom it may concern:*

Be it known that we, FRANK EMENEGGER and JOEL H. WESTFALL, citizens of the United States of America, residing at Petaluma, in the county of Sonoma and State of California, have invented certain new and useful Improvements in Cereal-Grain-Hulling Systems, of which the following is a specification.

This invention relates to certain new and useful improvements in cereal grain hulling systems.

The primary object of the present invention is the provision of a means for hulling cereal grains without grinding or mealing the same and is especially adapted for repeatedly hulling barley, oats and rice in large quantities and in perfect condition.

A further object of the invention is the provision of a cereal huller combining different forms of coöperating means successively for acting upon the stock, particles being pneumatically transferred during the operation of the device resulting in a clean product of entire grain.

A still further object of the device is to provide a hulling mill for cereal grains arranged for receiving the grain with its hulls and operating upon the stock for furnishing clean whole grain with the hulls and waste suitably collected, arrangement being made for conserving the stock for repeating the entire operation upon any uncleaned groats before the same can leave the mill.

With these general objects in view and others that will appear as the nature of the invention is better understood, the same consists in the construction, combination, and arrangement of parts hereinafter more fully described, illustrated in the accompanying drawings, and then claimed.

Figure 1:
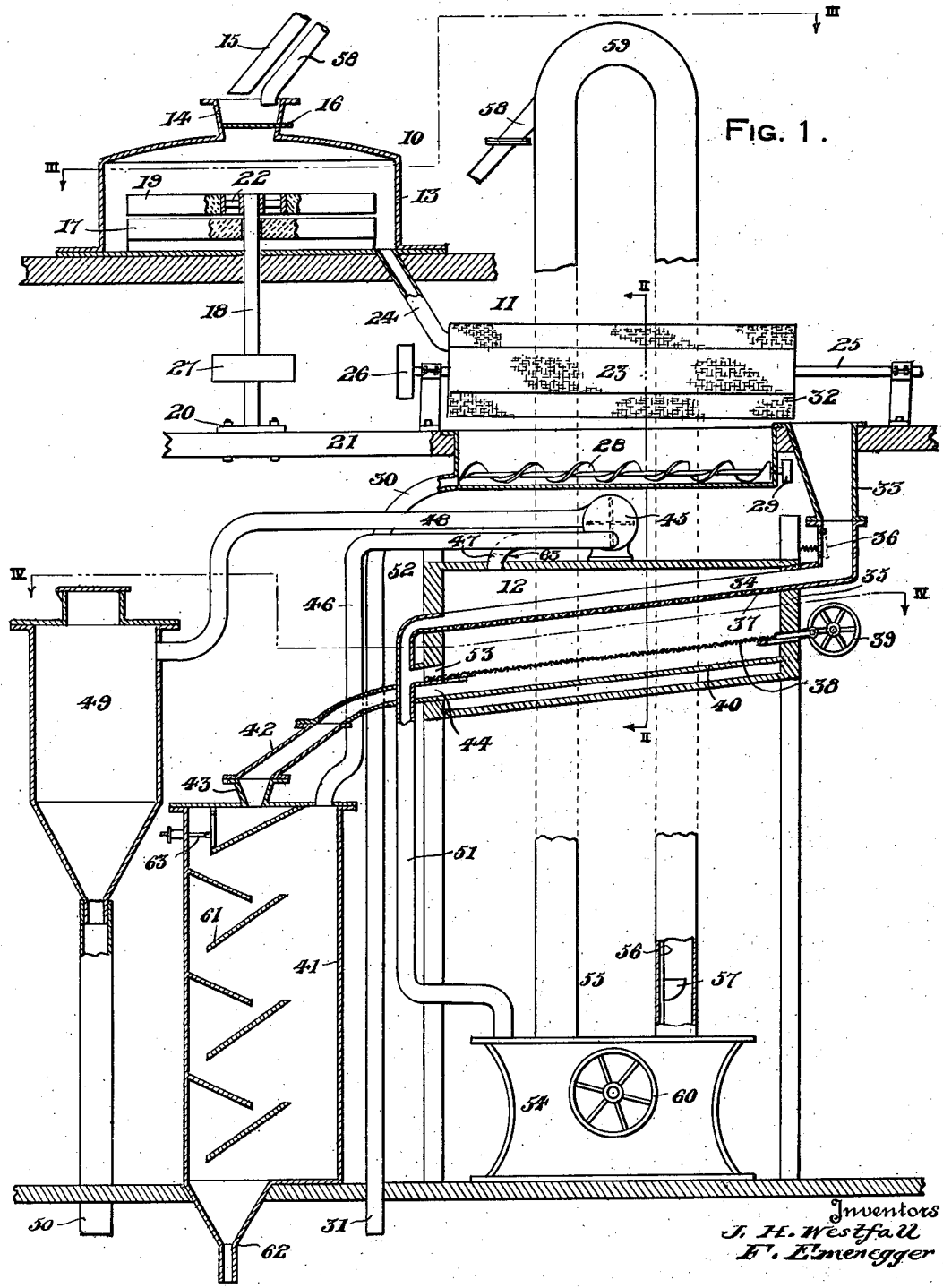
Figure 2:
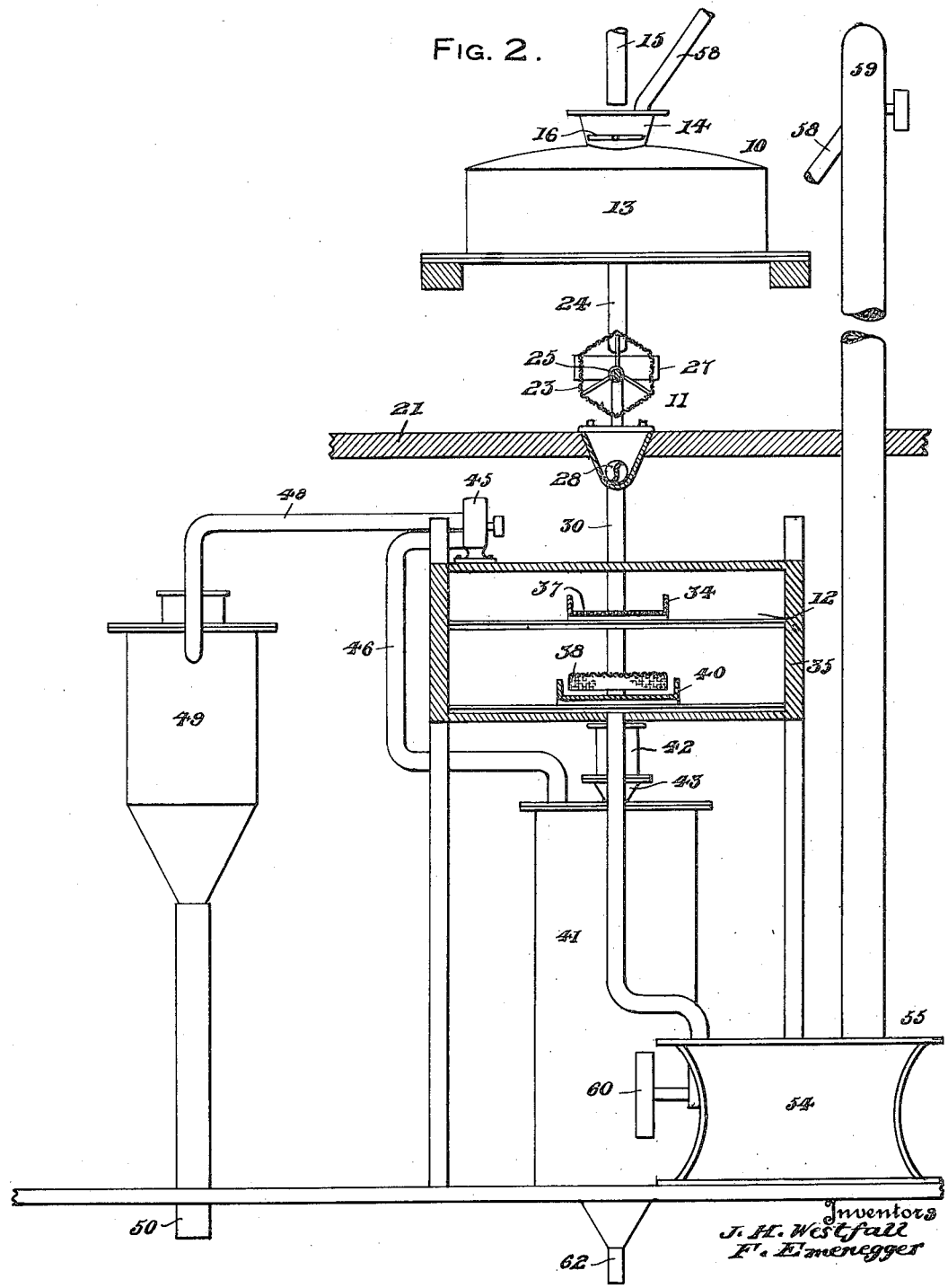
Figure 3:
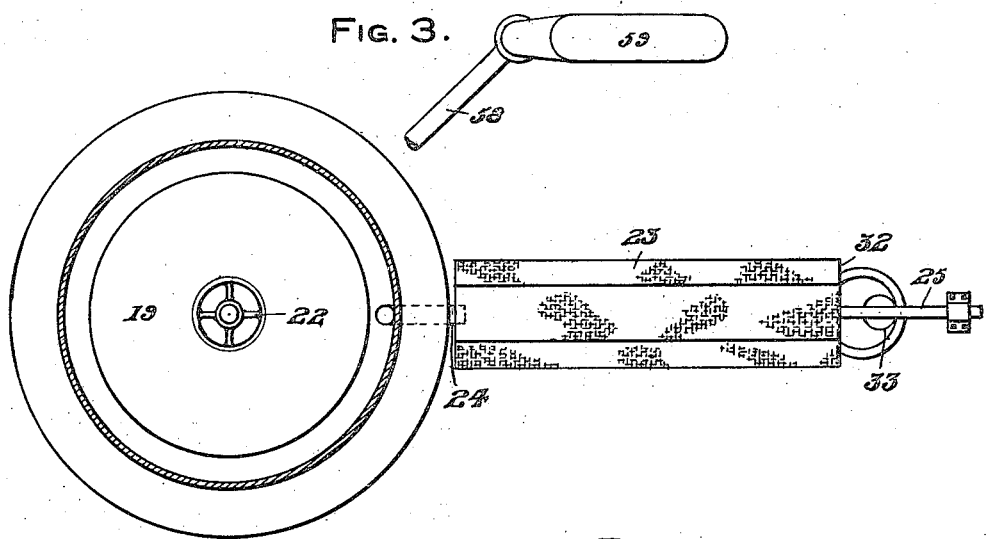
Figure 4:
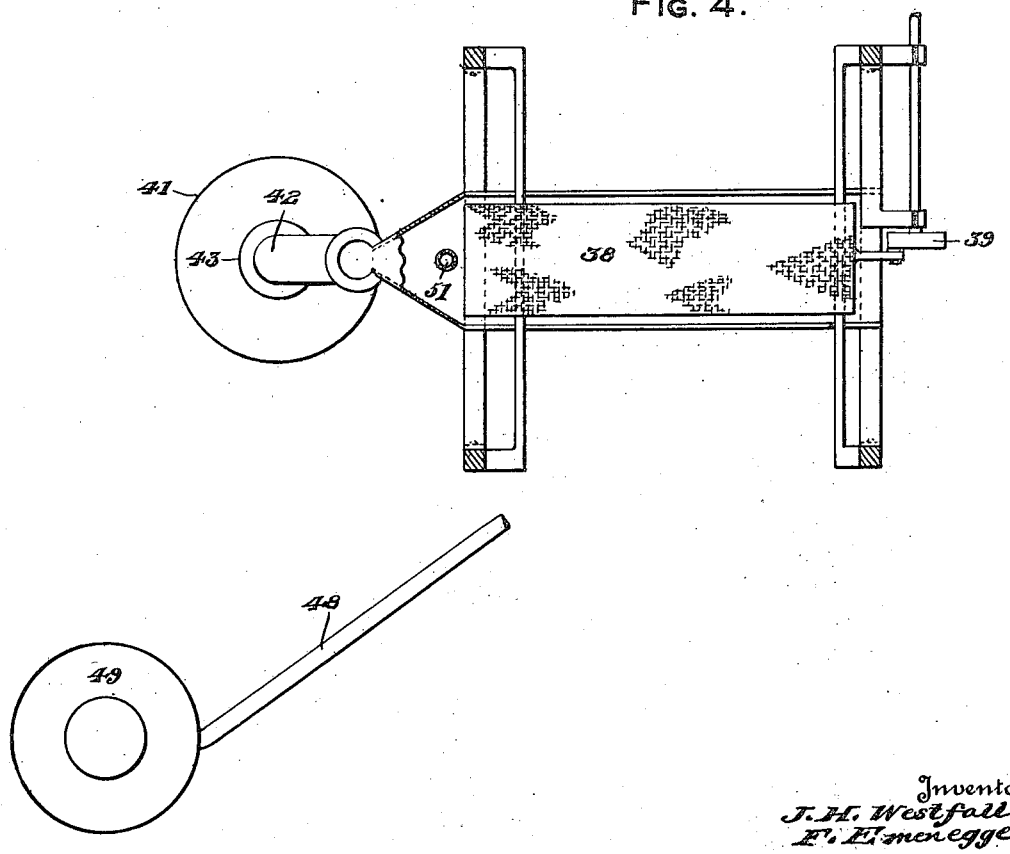

In the drawings forming a part of this application, and in which like designating characters refer to corresponding parts throughout the several views, Figure 1 is a vertical sectional view taken through the complete device portions being shown in elevation, Fig. 2 is an elevational view of the device with portions being shown in vertical section upon line II—II of Fig. 1, Fig. 3 is a horizontal sectional view taken upon line III—III of Fig. 1 and Fig. 4 is a transverse horizontal sectional view taken upon line IV—IV of Fig. 1.

It being understood that the device is solely designed for hulling cereals without crushing or injuring the grain, the device broadly consists of a disintegrator 10 for the stock, a hexagonal bolting reel or drum 11, and a balanced air vibrating aspirator 12 associated together for simultaneous operation in perfectly cleaning the grain.

The disintegrator 10 comprises a suitable housing 13 having a receiving hopper 14 positioned adjacent the lead spout 15 for the grain supply and having a feed gate 16. A bed stone 17 of suitable material is fixedly positioned within the housing 13 while a spindle 18 is journaled upright centrally within the housing 13 and through the bed stone, being provided upon its upper end with a composition or carborundum stone or runway 19. The lower end of the spindle 18 is journaled in a step bearing 20 mounted upon the bridge tree 21 while the hub 22 of the ruaway 19 permits the stock from the hopper 14 to pass therethrough to a point between the stones 17 and 19 whereby the hulls are separated from the berries or kernels of grain without mutilating the same.

The hexagonal reel 11 is in the form of a drum having a metallic foraminous wall 23 and is adapted to receive the cereal groats, hulls and dust or polish admitted thereto through the stock feed pipe 24 leading from the disintegrator housing 13. The reel 11 is slightly inclined and arranged with an operating shaft 25 having a driving pulley 26, it being noted that the disintegrator spindle 18 is arranged with a similar pulley 27.

The revolving of the reel 11 scrapes or scours the stock arranged therein so that the fine dust or polish passes through the sieve-like wall 23 of the reel to a screw conveyer 28 arranged therebeneath and operated by a pulley 29. An outlet spout 30 for the dust is arranged for the conveyer 28 having a discharge end 31 arranged at any desirable position.

The cereal groats and hulls pass out of the tail-end 32 of the reel 11 into an inlet or hopper 33 of the vibrating aspirator 12, it being understood that the reel 11 is slightly tilted downwardly toward the said inlet or hopper. The reel 11 having bolted the fine product from the hulls and berries of the stock, the stock passes through the inlet 33 into the feed spout 34 arranged at an incline through the casing 35 of the vibrating aspirator 12, it being noted that an automatic feed gate 36 is arranged for controlling the passage of the stock from the said inlet 33 to the spout 34.

The bottom 37 of the spout 34 is perforated for permitting the main portion of the stock to fall upon a vibrating screen 38 having an operating wheel 39 adapted for reciprocating the same. A metallic tray 40 is arranged beneath the vibrating screen 38 adapted for feeding the groats which pass through the screen to an upright aspirator 41 through a communicating pipe 42 arranged between the inlet 43 of the aspirator 41 and the outlet 44 of the tray 40 in the adjacent side of the casing 35 of the aspirator 12.

An aspirating fan 45 is mounted upon the casing 35 for the inlet thereof connected with the upright aspirator 41 by means of a suction trunk 46 while a branch pipe 47 from said trunk communicates with the interior of the vibrating aspirator casing 35. An inner or discharge trunk 48 leads from the outlet of the fan 45 to a hull collector 49 arranged with a discharge pipe 50 for the waste from the mill.

The vibrating aspirator 12 separates the hulls from the groats by reason of the spreading of the stock by the vibrating motion of the screen 38 permitting the free action of the air drawn in by the fan 45 through the branch pipe 47. The groats pass through the tray 40 to the upright aspirator 41 while the main air current lifts the hulls within the casing 35 and the counterbalanced air being of insufficient strength to lift the groats, while the hulls pass upwardly to the fan 45 and through the trunk 48 to the collector 49 having a discharge spout for the waste from the mill. The tail over from the vibrating aspirator 12 passes through a conduit 51 leading from the outlet 52 of the feed spout 34 and the outlet 53 of the vibrating screen 38 to the receiver 54 to a return elevator 55.

The elevator 55 comprises an endless belt 56 arranged with buckets 57 thereon for transferring the tailings from the vibrating aspirator 12 back to the stock hopper 14 by elevating the tailings and discharging them through the spout 58 of the elevator casing 59. An operating pulley 60 is provided for the elevator belt 56. The upright aspirator 41 is arranged with alternate baffle plates 61 over which the grain falls from the inlet 43 thereof to the discharge or sacking spout 62 arranged for the finished groats at the bottom of the upright aspirator 41. A controlling gate 63 guards the entrance to the aspirator 41 and it will be understood that the fan 45 by means of the suction trunk 46 provides a constant updraft through the aspirator 41 cleaning the grain from all remaining hulls and dust, such waste products being thereby transferred to the hull collector 49.

It will be understood that in the operation of the vibrating aspirator 12, with the suitably controlled balanced air therein removes the hulls from the grain, transferring such hulls to the collector 49 while the grain which is not perfectly hulled passes by way of the elevator 55 to the disintegrator 10 and the completely cleaned grain being unobstructed by the hulls attached to the berries passes through the screen 38 to the tray 40 and thence to the dust-cleaning upright aspirator 41 to be sacked from the spout 62 thereof. The air draft from the fan 45 within the casing 35 being insufficient to exhaust the groats through the fan, the same by reason of the inclination of the spout 34, screen 38 and tray 40 pass downwardly to the return elevator 55 if the same are carrying obstructing hulls, to the aspirator 41 if the groats are free from hulls.

A form of low grade meal will be received from the outlet spout 31 of the conveyer 28 and it will be understood that an air regulator for the aspirator 12 may be arranged in the form of a damper 63 within the branch pipe 47 if found desirable.

A serviceable hulling and cleaning mill for cereals is arranged in which all of the parts thereof coöperate to produce a finished product of perfect grain kernels while the hulls and all waste material is properly cared for.

While the form of the invention is believed to be the preferable embodiment thereof, it is nevertheless to be understood that minor changes may be made therein without departing from the spirit and scope of the invention as claimed.

What we claim as new is:—

1. A grain hulling mill including an aspirator having a casing, an inclined perforated feed spout extending therethrough, a similarly inclined vibrating screen beneath said spout, a similarly inclined outlet tray for groats arranged beneath the screen, and an air draft device communicating with the interior of the casing above said spout adapted for exhausting hulls from the casing.

2. A grain hulling mill including an aspirator having a casing, an inclined perforated feed spout extending therethrough, a similarly inclined vibrating screen beneath said spout, a similarly inclined outlet tray for groats arranged beneath the screen, an air draft device communicating with the interior of the casing above said spout adapted for exhausting hulls from the casing, an outlet for tailings leading from said spout and said screen, and means to return the tailings from said outlet to the inlet of said spout.

3. A hulling mill for cereal grains including means to bolt the grains, a vibrating aspirator adapted to receive the grains from the bolting means to separate hulls from groats, an alternating aspirator in communication with said vibrating aspirator to receive groats therefrom, a hull collecting means including a suction fan having its inlet in communication with both of said aspirators, and a sacking spout for finished groats provided for the alternating aspirator.

4. A hulling mill for cereal grains including an aspirator casing, a hull collector including an air exhausting fan upon the casing having the inlet thereof communicating with the interior of the casing through the top of the latter, an inclined perforated stock feeding spout extending longitudinally through the casing, a similarly inclined vibrating screen in the casing beneath said spout, a similarly inclined fixed tray in the casing beneath said vibrating screen, a second aspirator communicating with the outlet of said tray and having a sacking spout, and means connecting the said second aspirator with the inlet of said hull collector fan.

In testimony whereof we affix our signatures.

FRANK EMENEGGER.
JOEL H. WESTFALL.